3,458,317
PRINT-OUT SILVER HALIDE EMULSIONS CONTAINING ACCEPTORS IN COMBINATION WITH DEVELOPMENT RESTRAINERS

Joseph R. Ditzer, Jr., and Fred W. Spangler, Rochester, N.Y., assignors to Eastman Kodak Company, Rochester, N.Y., a corporation of New Jersey
No Drawing. Continuation-in-part of application Ser. No. 500,989, Oct. 22, 1965. This application Apr. 7, 1967, Ser. No. 629,092
Int. Cl. G03c 1/72
U.S. Cl. 96—94       22 Claims

ABSTRACT OF THE DISCLOSURE

A photographic print-out silver halide emulsion comprising a nitrogen-containing halogen acceptor and a development restrainer. Typical development restrainers are anthraquinone-2-sulfonic acids and their alkali metal salts and heterocyclic compounds having at least 5 atoms in the ring structure wherein at least 4 atoms in the ring structure are nitrogen atoms. In one aspect, this invention relates to a photographic element which will produce a print-out image upon exposure to light and, which upon chemical processing, will produce a single high density silver image with low background density.

---

This application is a continuation-in-part of Ser. No. 500,989, filed Oct. 22, 1965.

This invention relates to novel photographic compositions, photographic elements made from said compositions and methods for processing photographic elements. In one aspect this invention relates to a novel photographic composition. In another aspect this invention relates to novel photographic elements comprising novel combinations of materials which will print out an image on exposure and develop out a more permanent image on subsequent chemical development. Still another aspect of this invention relates to novel methods for exposing and processing photographic elements.

Automatic photomechanical drafting equipment can be utilized to prepare a plurality of images on a photographic support. Such equipment provides for mechanical and optical means which allow an operator to position an image on the surface of a light-sensitive element. With such equipment exposure is made in a particular area of the light-sensitive element and thereafter, the second image is positioned in a different area and a second exposure is made, and so on for third, fourth, fifth exposures, if desired. In the operation of the devices of this type, it is essential that each subsequent exposure be positioned accurately in relation to the prior exposure to allow for arcuate positioning of each exposure. It is desirable for the operator to immediately see a visible image in each exposed area before positioning the element for a second exposure. Multiple layer photographic elements having a print-out layer and a develop-out layer have been used to achieve proper positioning of the element. However, ghost images appear in the chemically developed element by image formation in the print-out layer.

It would be desirable to provide means for forming a photographic element having a print-out layer and a developing-out layer which produce only one image in the final developed product to obviate problems encountered with images in separate layers of the element. It is, therefore, an object of this invention to provide a novel photographic emulsion.

It is another object of this invention to provide a novel photographic print-out emulsion which can be chemically developed to form sharp, high-contrast images.

It is another object of this invention to provide novel photographic emulsion which yields a very low density print-out image after chemical development of the exposed emulsion. It is another object of this invention to provide a novel photographic emulsion which will yield a good print-out image and which can be subsequently chemically developed to form sharp, high-contrast images.

It is another object of this invention to provide novel photographic elements which will produce a visible image immediately upon exposure to light, and which upon subsequent chemical processing, will produce a single high density silver image with low background density.

It is another object of this invention to provide a novel method for processing a photographic element having a print-out image and a latent image in at least one layer whereby a high density silver image is obtained with a low background density.

It is likewise an object of this invention to provide a new process of preparing a plurality of images on a photographic element in a predetermined relationship with each other utilizing a plurality of image exposures, the image positioning for each exposure being determined from visible images resulting from any previous exposures.

These and other objects of the invention are accomplished with a photographic print-out silver halide emulsion comprising a nitrogen-containing halogen acceptor and a development restrainer. In one embodiment of the invention, a single layer of the print-out emulsion is coated on a support, sequentially exposed and then developed and fixed to provide a permanent, sharp, high-contrast silver image in the areas of exposure.

In another aspect of the invention a print-out emulsion prepared in accordance with this invention is coated on a support. A second layer of a chemically developable silver halide emulsion is also coated thereon. After sequential exposure, the element is chemically developed to provide a permanent, high-contrast image in the develop-out layer and substantially no image in the print-out layer.

In still another aspect, a photographic element comprising silver halide emulsion in combination with a halogen acceptor are exposed to actinic light and are subsequently developed in the presence of a development restrainer to provide a permanent, high-contrast silver image.

The development restrainers which can be employed with the photographic silver halide, print-out emulsions of his invention are anthraquinone-2-sulfonic acids and their alkali metal salts and heterocyclic compounds having at least 5 atoms in the ring structure wherein at least 4 atoms in the ring structure are nitrogen atoms. The ring structure of the heterocyclic compounds includes the bridged ring and fused ring structures: at least 4 nitrogen atoms must be present in the total ring structure for the heterocyclic compound to be an effective development restrainer.

The preferred anthraquinones employed in the practice of this invention are derivatives of anthraquinone and contain a sulfonic acid function in the 2-position. The sulfonic acid function can be in the free (—$SO_3H$) form or in the salt (—$SO_3M$) form. M is a cation, for example, hydrogen or an alkali metal such as sodium, potassium, ammonium, an organic amine residue of such amines as triethylamine, triethanol amine, morpholine, and the like. Suitable anthraquinone sulfonic acids or salts thereof which can be employed in the practice of this invention include, for example, anthraquinone-2-sulfonic acid, anthraquinone-2,6-disulfonic acid, anthraquinone-2,7-disulfonic acid, anthraquinone-1,2-sulfonic acid and the like as well as salts, particularly alkali metal salts thereof. The anthraquinone derivatives are generally employed in the emulsion in concentrations of about .1 to 50 millimoles per mole of silver halide and preferably about 1–15. When they are incorporated in the developer, they are generally employed in concentrations of about .01 to about 2.0 grams per liter of the developing solution. Compounds of this type are disclosed in U.S. Patent 2,504,593, issued Apr. 18, 1950, and in U.S. Patent 1,753,911, issued Apr. 8, 1930.

The preferred heterocyclic compounds employed in the invention are the tetrazoles, tetrazaindenes, and iminotriazoles. Generally, the mercapto tetrazoles are very effective development restrainers in the print-out emulsions. The 5-mercapto tetrazoles which can be employed in the practice of this invention include those having the formula:

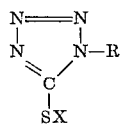

where R is an aliphatic or aromatic radical containing up to 30 carbon atoms and SX is a mercapto function. The mercapto function or group can be in the free (—SH) form or in the salt (—SX) form. X is a cation, for example, hydrogen, an alkali metal such as sodium, potassium, ammonium or an organic amine residue of such amines as triethyl amine, triethanol amine, morpholine and the like. In addition, many of the mercapto heterocyclic nitrogen compounds can be in the tautameric form, for example, in the thione form, in which case the labile hydrogen atom in the mercapto function becomes bonded to the nitrogen atom and the

group becomes a tiocarbonyl (>=S group. The term 5-mercapto tetrazole, as employed herein, is intended to cover compounds in which the mercapto function is in any of these forms. R can be hydrocarbon or non-hydrocarbon and includes alkyl or aryl radicals which can contain atoms or groups other than carbon and hydrogen. Suitable atoms or groups which can be present in R together with hydrogen and carbon include, for example, alkoxy, phenoxy, halogen, cyano, nitro, amino, substituted amino, sulfo, sulfamyl, substituted sulfamyl, sulfonylphenyl, sulfonylalkyl, flurosulfonyl, sulfonamidophenyl, sulfonamidoalkyl, carboxy, carboxylate, carbamyl, carbamylphenyl, carbamylalkyl, carbonylalkyl, carbonylphenol and similar groups. Examples of 5-mercapto tetrazoles which can be employed in the practice of this invention include 1-phenyl-5-mercapto tetrazoles, 1-ethyl-5-mercapto tetrazole, 1-alpha-naphthyl mercapto tetrazole, 1-cyclohexyl-5-mercapto tetrazole, and the like. Compounds of this type are disclosed in U.S. Patent 2,403,927 issued July 16, 1946, and U.S. Patent 2,271,229, issued Jan. 27, 1942. Typical examples of the tetrazaindenes and imide-triazoles are the sodium salt of 4-hydroxy-6-methyl-1,3,3a,7-tetrazaindene; the sodium salt of 4-hydroxy-6-methyl-2-methylmercapto-1,3,3a,7-tetrazaindene; 4,5-dihydro-1,4-diphenyl-3,5-phenyl-imino-1,2,4-triazole and the like. The heterocyclic development restrainers are employed in concentrations of generally about .1 to 50 millimoles per mole of silver and preferably about .1 to about 15 millimoles.

In the typical practice of this invention, the development restrainers are employed in the emulsion layer which forms the print-out image upon exposure. A single layer element can be constructed wherein the layer will produce a print-out image upon exposure and a permanent, high-contrast sharp image upon subsequent chemical development. The development restrainer is very effective in the single layer embodiment for preventing chemical development of the latent images produced by scattered light. A double layer embodiment can also be constructed wherein one layer is primarily a print-out layer and the second layer is primarily a develop-out layer. The development restrainer is employed in the print-out layer while no development restrainer is required in the develop-out layer. A relatively high concentration of the development restrainer is added to the print-out layer when a separate print-out layer is employed in the element. The high concentration of development restrainer prevents any substantial chemical development of the print-out layer resulting in a layer with substantially no discernible image and a relatively low density. The emulsion for the separate layers are, of course, optimized in composition in this preferred embodiment to give maximum initial print-out image density in the print-out layer and short exposure time with a high contrast sharp image upon chemical development in the developing-out layer.

In some instances the development restrainers of this invention also have the ability to act as halogen acceptors. However, the general advantages set forth above cannot be obtained when the development restrainers are used alone, but only when the development restrainers of this invention are used in combination with a highly effective halogen acceptor.

Generally any photographic silver halide emulsion having a predominant amount of sensitivity internal to the silver halide grains can be utilized for the print-out layer or combined print-out—developing-out layers according to this invention. Suitable photographic silver halides include silver bromoiodide, silver chlorobromide, silver chlorobromoiodide and the like and can be prepared by the methods described in Luckey et al. U.S. Patent 2,996,382 issued Aug. 15, 1961, McBride U.S. Patent 3,271,157, issued Sept. 6, 1966, and Davey and Knott U.S. Patent 2,592,250, issued April 8, 1952.

Silver halide systems which are particularly useful in preparing the print-out layers of this invention contain silver halide grains with occluded polyvalent ions therein. Such silver halide grains are precipitated in the presence of polyvalent metal ions such as lead, bismuth, antimony, arsenic, gold, iridium, rhodium and the like. The polyvalent ion is normally added with the water-soluble silver salt (e.g., silver nitrate) or the water-soluble silver halide (e.g., sodium or potassium iodide, bromide or chloride) that are reacted to form the photographic silver halide systems. The silver halide grains can be analyzed for occluded polyvalent ions by analyzing successive washings of the silver halide grains with a silver halide solvent such as an organic thioether or an alkali metal thiocyanate. If the polyvalent ion is contiguous to the surface of the silver halide grain substantially all of the polyvalent ions will be removed during the first washings while silver halide grains with occluded polyvalent ions therein yield relatively high polyvalent ion concentration in the latter washings just prior to complete dissolution of the silver halide grains. In a preferred embodiment, silver halide grains with polyvalent ions occluded therein are used to increase the print-out characteristics of the print-out layer. Organic thioethers and alkali metal thiocyanates can also be present during the precipitation or grain growth periods in the preparation of the silver halides for the single layer element to provide higher image permanence and high image discrimination in the print-out layer.

The developing-out negative silver halide layer of the present photographic elements is a high contrast, fine-grain silver halide which typically has a gamma of at least about 3. Typically, such a silver halide layer has an average particle size less than about one micron and more generally less than about .5 micron. High contrast or high gamma emulsions are well known in the graphic arts field and can be prepared by techniques well known in the art. Fine-grain Lippmann emulsions such as those referred to by Mees, The Theory of the Photographic Process, the MacMillan Company, New York, 1942 edition, page 34, can be utilized for the present developing-out negative silver halide layer. Suitable developing-out negative silver halide is that which is chemically developable in conventional developing compositions having low silver halide solvent-action and which has silver halide that forms latent images predominantly on the surface. The halide of the developing-out negative silver halide is preferably at least 50 mole percent chloride. Such developing-out negative silver halide systems can be prepared in the absence of a binder or dispersing agent such as by vacuum deposition of the silver halide, although we prefer to utilize developing-out emulsion systems.

The developing-out negative silver halide layer can also comprise silver halide grains which contain polyvalent ions occluded therein. In a preferred embodiment of this invention, it has been found that, in particular, silver halide grains with tetravalent ions occluded therein have very good properties for chemical development in the developers used in this invention. Moreover, the addition of halogen acceptors and polyvalent metal salts, such as trivalent rhodium salts, iridium salts and the like or tetravalent iridium salts, platinum salts, osmium salts and the like, to the emulsion provides a developing-out layer which has excellent image quality.

Generally, any of the developing agents such as the 3-pyrazolidones, polyhydroxy benzenes, aminophenols, such as N-methyl-p-aminophenol, or the like may be used to obtain the silver image. When the silver halide emulsions used in the invention have a high degree of internal sensitivity, silver halide solvents as thiosulfate and thiocyanates are incorporated in the developing solution to develop the internal latent image-forming silver halide grains.

The compositions of the invention contain halogen acceptors generally disclosed to be useful in direct-print systems, i.e., systems which can be exposed to high intensity light and will develop-out upon subsequent exposure to room-light. However, not all halogen acceptors generally useful in direct-print systems are useful in the present invention. The halogen acceptors useful in this invention are nitrogen-containing halogen acceptors, particularly those having the formulas:

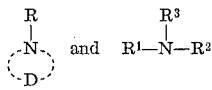

wherein: R, $R^1$ and $R^3$ can each be hydrogen atoms, alkyl radicals, aryl radicals, including substituted alkyl and aryl radicals, or acyl radicals (e.g.,

wherein $R^4$ is a hydrogen atom, an alkyl radical or an aryl radical); $R^2$ can be a nitrogen-containing radical such as an amino radical or a thiocarbamyl radical, including substituted amino and thiocarbamyl radicals; and D represents the necessary atoms to complete a heterocyclic nucleus generally having 5 to 6 atoms including at least two nitrogen atoms and at least one divalent radical having the formula

wherein X can be sulfur atom, and oxygen atom, a salenium atom or an imino radical ($=$NH). When a nitrogen atom is included in D or $R^2$ and such nitrogen atom is attached directly to the nitrogen atoms of the above formulas, at least one hydrogen atom is attached to at least one of such nitrogen atoms of the halogen acceptor. The amino radical for substituent $R^2$ can be represented by the formula

wherein $R^3$ and $R^6$ can each typically be such substituents as hydrogen atoms, alkyl radicals, aryl radicals or acyl radicals as described above for $R^1$ and $R^5$. The thiocarbamyl radical for substituent $R^2$ can be represented by the formula

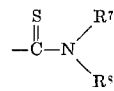

wherein $R^7$ and $R^8$ can be the same substituents as $R^5$ and $R^6$ or amino radicals.

Particularly useful nitrogen-containing halogen acceptors used in the emulsions of the invention can be further represented by the following subgeneric formulas:

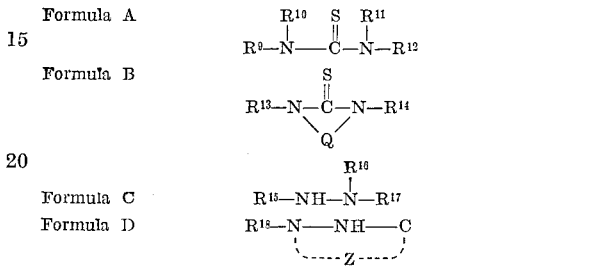

wherein: $R^9$, $R^{10}$, $R^{11}$, $R^{12}$, $R^{13}$, $R^{14}$, $R^{15}$, $R^{16}$, $R^{17}$, and $R^{18}$ can each be hydrogen atoms, alkyl radicals, aryl radicals or acyl radicals as described above for $R^1$ and $R^3$; E can be a sulfur atom, an oxygen atom, a selenium atom or an imino radical; and Q and Z can be the necessary atoms to complete a heterocyclic nucleus generally having 5 or 6 members. However, the halogen acceptors which are useful in this invention have no more than three nitrogen atoms in the heterocyclic nucleus. Q and Z typically are the necessary atoms to complete such moieties as a triazole-thiol, a mercaptoimidazole, an imidazolidine-thione, a triazene-thiol, a thiobarbituric acid, a thiouricil, a urazole including a thiourazole and the like heterocyclic moieties.

With respect to the above formulas of nitrogen-containing halogen acceptors: the aryl radical substituents are those of the naphthyl and phenyl series, and include such common substituents as alkyl groups, halogen atoms, acyl radicals and the like; the alkyl radical substituents typically can contain 1 to 20 carbon atoms and more generally 1 to 8 carbon atoms, and can be substituted with such radicals as aryl radicals, halogen atoms, acyl radicals and the like.

The thiourea compounds represented by Formulas A and B and the urazole compounds represented by Formula D are used in the preferred embodiments of the invention as they produce a higher contrast and a sharper image in the emulsions. However, the remaining halogen acceptors described above are operable in the system and can be used to provide a single layer in a photographic element capable of forming a print-out image and a developing-out image.

Typical useful halogen acceptors of the thiourea type represented by Formula A and Formula B are disclosed in Kitze U.S. Patent 3,241,971, issued Mar. 22, 1966; and in copending Fix application U.S. Ser. No. 338,605, filed Jan. 20, 1964. Typical halogen acceptors of the hydrazine type represented by Formula C are disclosed in Ives, U.S. Patent 2,588,982, issued Mar. 11, 1952. Typical halogen acceptors of the type represented by Formula D are the urazole and thiourazole halogen acceptors disclosed in Bacon and Illingsworth application, U.S. Ser. No. 406,186, filed Oct. 23, 1964.

Examples of specific nitrogen-containing halogen acceptors are set out below:
1,3-dimethyl-2-imidazolidinethione,
2-imidazolidinethione,
thiosemicarbazide,
tetramethylthiourea,
p-dimethylaminobenzaldehyde-thiosemicarbazone,
1-isopentyl-2-thiourea, 1-(2-diethylaminoethyl)-1,2,5,6-tetrahydro-1,3,5-triazine-4-thiol,
1,2-bis(1,2,5,6-tetrahydro-1,3,5-triazine-4-thiol)ethane,
1-phenyl-2-thiourea,
1,3-diphenyl-2-thiourea,
4-thiobarbituric acid,
2-thiouracil,
1-acetyl-2-thiourea,
1,3-dibenzyl-2-thiourea,
1,1-diphenyl-2-thiourea,
1-ethyl-1-(alpha-naphthyl)-2-thiourea,
2-mercaptoimidazole,
1-phenyl-2-imidazolidinethione,
4,5-diphenyl-4-imidazolidine-2-thione,
1-methyl-2-mercaptoimidazole,
1-n-butyl-1,2,5,6-tetrahydro-1,3,5-triazine-4-thiol, thiourea,
1-methyl-2-imidazolidinethione,
d-mannose thiosemicarbazone,
morpholino-2-propane thiosemicarbazone,
d-galactose thiosemicarbazone,
urazole,
3-thiourazole,
3,5-dithiourazole,
4-aminourazole hydrazine salt,
3,5-dithiourazole hydrazine salt,
urazole sodium salt,
4-(1-naphthyl)urazole,
4-ethylurazole,
1-phenylurazole,
4-phenylurazole,
1-butylurazole,
1-octylurazole,
4-butyl-3,5-dithiourazole,
1,4-diphenylurazole,
1,4-dibutylurazole,
1,4-dibutyl-3,5-dithiourazole,
1,4-diphenyl-3,5-dithiourazole,
1-ethyl-4-phenylurazole,
1-ethyl-4-phenyl-3,5-dithiourazole,
3-thio-5-iminourazole,
5-selenourazole,
hydrazine,
phenylhydrazine hydrochloride,
2,5-dichlorophenyl hydrazine,
p-tolylhydrazine hydrochloride,
alpha-naphthylhydrazine,
alpha-benzyl-alphaphenylhydrazine,
p-toluene sulfonyl hydrazine,
hexylhydrazine.

Various colloids can be used as vehicles or binding agents in preparing the silver halide emulsions of this invention. Satisfactory colloids which can be used for this purpose include any of the hydrophilic colloids generally employed in the photographic field, including, for example, gelatin, colloidal albumin, polysaccharides, cellulose derivatives, synthetic resins such as polyvinyl compounds, including polyvinyl alcohol derivatives, acrylamide polymers and the like. In addition to the hydrophilic colloids, the vehicle or binding agent can contain hydrophobic colloids such as dispersed polymerized vinyl compounds, particularly those which increase the dimensional stability of photographic materials. Suitable compounds of this type include water-insoluble polymers of alkyl acrylates or methacrylates, acrylic acid, sulfoalkyl acrylates or methacrylates and the like.

The photographic emulsions and elements of the invention can contain or have associated therewith addenda generally utilized in photographic products including antifoggants, hardeners, plasticizers, coating aids and the like. The silver halide layers of the subject photographic elements are characterized as having high sensitivity to light having shorter wavelengths, particularly to light in the ultraviolet region of the spectrum, and low sensitivity in the green and red regions of the spectrum. Hence, the subject silver halide systems are free of spectral sensitization with longer wavelengths. Preferably, yellow filter dyes or pigments are also utilized in the silver halide layer to avoid blue light scatter and produce a sharper image. The yellow dyes or pigments can also be utilized to permit roomlight handling of the photographic element. Such filter materials are removed during processing. The silver halide print-out layer preferably contains a photographic desensitizing compound, i.e., an electron acceptor, to reduce its sensitivity and to prevent overexposure when this layer is suitably exposed to produce a print-out image therein. Silver halide desensitizing dyes are well known to those skilled in the present art; suitable desensitizers include heterocyclic compounds containing at least one hetero atom such as sulfur or nitrogen, anthraquinone dyes and the like.

Any photographic support can be utilized in preparing the photographic elements of the invention. Typical supports include paper, particularly paper coated with polyolefins; polyethylene, ethylene butene copolymer, glass, cellulose nitrate film, cellulose acetate film, linear polyester films such as polyethylene terephthalate; polystyrene film, polycarbonate film, and related materials.

In a preferred embodiment of this invention the gelatino silver halide print-out emulsion containing a nitrogen-containing halogen acceptor and a development restrainer are coated in a single layer upon a support or a subbed support. However, the silver halide, the nitrogen-containing halogen acceptor and the development restrainer can all be coated in separate layers on the support. Sufficient diffusion of components takes place during coating and chemical development to result in a print-out system which can be subsequently chemically developed to a sharp, high-contrast image.

In utilizing the photographic elements of the invention, a light source that is rich in ultraviolet light is typically utilized. In the preferred embodiment of the invention, a photographic element comprising a transparent support with the silver halide layer coated thereon is positioned with the emulsion layer toward the light source. The operator is normally positioned behind the photographic element whereby the actinic rays will be visible through the photographic element. Typically, a suitable safelight filter (Kodagraph orange sheeting) is placed between the operator and the photographic element to prevent fogging and to facilitate viewing in roomlight. A red filter (e.g., No. 25 Wratten filter) is typically positioned in the image beam to prevent a premature exposure while the image is being visually positioned on the photographic element by the operator. For the exposure step, the red light filter is removed from the light path and an immediate print-out image is discernible to the operator, this print-out image typically having a density of the magnitude of about .05 to about .1. The subject photographic elements are of such thickness in composition that such a print-out image can be observed through the photographic element. Simultaneously, a latent image is formed in the silver halide layer. The visible print-out image is used by the operator to position subsequent exposures and to detect positional errors of earlier exposures.

After the sequential image exposures of a photographic element of the invention are complete, the exposed element is chemically developed in a conventional developing composition, preferably a developing composition having high silver halide solvent action whereby the internal image can be developed. Such processing develops to metallic silver the latent images in the silver halide layer. Suitable developing compositions are aqueous alkaline compositions containing a silver halide developer such as 3-pyrazolidone, polyhydroxy benzenes, aminophenols such as N-methyl-p-aminophenol or the like. Silver halide solvents such as thiosulfates and thiocyanates are incorporated in the developing solution to provide solvent action for developing internal image emulsions.

The invention can be further illustrated by the following examples of preferred embodiments thereof, although it will be understood that the examples are included merely for the purposes of illustration and are not intended to limit the scope of the invention unless otherwise specifically indicated.

EXAMPLE I

A light-sensitive, print-out, gelatino, unsensitized, fine-grain silver bromoiodide emulsion (about 60 mole percent bromide and 40 mole percent chloride) is prepared by introducing a solution of AgNO₃, a solution of KCl and a solution of KBr simultaneously into an aqueous gelatin solution with rapid stirring. The emulsion is washed to remove the soluble salts. The emulsion is mixed with about 5.0 grams of tartrazine yellow, 1.3 grams of 2-mercaptoimidazole and 1.0 gram of anthraquinone-2-sulfonic acid sodium salt and about 2.0 grams of formaldehyde, such emulsion addenda being added in the amounts indicated per each mole of silver halide.

The resulting emulsion is coated on a conventional linear polyester (polyethylene terephthalate) film support at a coverage of 200 mg. of silver per square foot.

The resulting film was successively exposed with a high intensity ultraviolet light (200 watt mercury arc lamp) to a plurality of images in a photomechanical drafting device. The emulsion layer of the photographic element was positioned, facing the operator.

A Kodagraph orange sheeting was placed between the operator and the photographic element to prevent fogging when viewing in roomlight. The emulsion layer was exposed for a sufficient length of time to produce a print-out image which was visible to the operator through the photographic element. A plurality of such exposures were made in different areas of the photographic element, each exposure producing a print-out image visible through the photographic element. After completion of the exposures, the photographic element is processed by developing for three minutes at 68° F. in Kodak D–19 developer, fixed, washed and dried in the usual manner. After processing, sharp, high-contrast silver images result in the areas of exposure.

EXAMPLE I-A

The image quality obtained when the anthraquinone development restrainer is not used is relatively poor compared to the image obtained in Example I. A photographic element is prepared by the procedure according to Example I, except the sodium salt of anthraquinone-2-sulfonic acid is omitted from the element. The element is exposed and developed as described in Example I. After processing, an image is formed in the areas of exposure which has poor detail and relatively low contrast compared to the image of Example I.

EXAMPLE I-B

When the anthraquinone compound is absent in the element, similar image quality can be obtained by contacting the element with the anthraquinone compound before or during development of the image. A photographic element is prepared by the same procedure according to Example I, except for the omission of the anthraquinone-2-sulfonic acid sodium salt, and is exposed by the procedure of Example I. After completion of the exposure, the photographic element is developed for three minutes at 68° F. in a Kodak D–19 developer containing .07 gram anthraquinone-2-sulfonic acid sodium salt per liter of developing solution. After processing, sharp, high-contrast images similar to those obtained in Example I result in the areas of exposure.

EXAMPLE II

A light-sensitive, large grain, gelatino silver chlorobromide emulsion (about 40 mole percent chloride and about 60 mole percent bromide) having silver halide grains of high internal sensitivity is prepared by slowly adding an aqueous solution of silver nitrate containing .85 gram of lead nitrate per mole of silver to an agitated gelatin solution of potassium bromide and potassium chloride at 71° C. To the resulting emulsion is added 5 grams of tartrazine yellow, 1.3 grams of 2-mercaptoimidazole, 1.0 gram of 1-phenyl-5-mercaptotetrazole and 2.0 grams of formaldehyde, such emulsion addenda being added in the amount indicated per each mole of silver halide. The resulting emulsion is coated on a polyethylene terephthalate film support at a coverage rate of 200 mg. of silver per square foot.

The resulting film is exposed and developed as described in Example I. After processing, sharp, high contrast silver images result in the areas of exposure.

A similar sharp, high contrast silver image is obtained when thiourea, thiosemicarbazide, 4,5-diphenyl-4-imidazolidine-2-thione and 3,5-dithiourazole hydrazine salt are used as the halogen acceptor along with the mercaptotetrazole development restrainer.

EXAMPLE III

A light-sensitive, gelatino silver chlorobromoiodide (about 90 mole percent chloride, 9 mole percent bromide, and 1 mole percent iodide) is prepared according to the method described in Luckey et al. Patent No. 2,996,382, issued Aug. 15, 1961. To this emulsion is added 1.3 grams of 2-mercaptoimidazole, 2.0 grams of the development restrainer Nitron, and 2.0 grams of formaldehyde, such emulsion addenda being added as indicated per each mole of silver halide. The resulting emulsion was coated on a polyethylene terephthalate support at a coverage rate of 200 mg. of silver per square foot. The resulting film was exposed and developed as described in Example I. The resulting image had a high contrast with sharp detail in the areas of exposure.

In contrast, when the anthraquinone compounds are used in combination with stannous chloride, hydroquinone or thiosalicyclic acid halogen acceptors the image formed after exposing and processing (as set forth in Example I) has relatively low contrast and poor detail compared to the image when a nitrogen containing halogen acceptor is used in the emulsion.

EXAMPLE IV

A photographic element is prepared as in Example I except 3.0 grams of 3,5-dithiourazole hydrazine was used in place of the 2-mercaptoimidazole in the emulsion. The photographic element was exposed and developed in a procedure similar to Example I. Similar results were obtained in that a high contrast, sharp image was obtained in the areas of exposure.

Similar results are obtained when development restrainers such as anthraquinone-2,6-disulfonic acid, anthraquinone-1,2-disulfonic acid, and 4-hydroxy-6-methyl-1,3,3a,7-tetrazaindene are used in place of anthraquinone-2-sulfonic acid sodium salt in the emulsion as described in Example I or in the developer as described in Example I-B.

EXAMPLE V

A double layer element having a separate print-out layer and a separate develop-out layer is made to give the optimum desired properties to each respective layer.

Print-out emulsion.—A gelatino silver chlorobromide (5 mole percent chloride, 95 mole percent bromide) photographic emulsion is prepared by slowly adding simultaneously an aqueous solution of silver nitrate and an aqueous solution of alkali metal halides to an agitated aqueous gelatin solution containing about 0.15 gram of bismuth trinitrate pentahydrate/mole of silver halide at 60° C. at a pH of about 2.0. The emulsion is washed to remove soluble salts. About 5.0 grams of a halogen acceptor dithiourazole hydrazine salt and about 2.0 grams of a development inhibitor 1-phenyl-5-mercaptotetrazole per mole of silver are added to the emulsion along with a hardener, formaldehyde, and an anionic coating aid. The emulsion is coated on a polyethylene terephthalate support at a silver coverage of approximately 250 mg. of silver and 495 mg. of gelatin/ft.².

Developing-out emulsion.—A silver chlorobromide (5 mole percent chloride, 95 mole percent bromide) photographic emulsion is prepared by slowly adding simultaneously an aqueous solution of silver nitrate and an aqueous solution of alkali metal halides to an agitated aqueous gelatin solution containing 5.0 mg. of potassium chloro-osmate ($K_2OsCl_6$) per mole of silver halide at 60° C. at a pH of about 2.0. The emulsion is washed and the following ingredients are added: ammonium chlororhodate (100 mg./silver mole), dithiourazole hydrazine salt (1.0 g./silver mole), 0.7 g. tartrazine per mole of silver halide, formaldehyde and an anionic coating aid. The emulsion is coated on the side of the support opposite to the print-out emulsion described above at a coverage of approximately 250 mg. of silver and 550 mg. of gelatin/ft.$^2$.

A sample of the film is sequentially exposed with a high intensity ultraviolet light (220 watt mercury arc lamp) to a plurality of images as described in our copending application Ditzer et al., Ser. No. 500,989, filed Oct. 22, 1965. The print-out silver halide emulsion layer is exposed for a sufficient length of time to produce a visible print-out image. A corresponding latent image is produced in the developing-out silver halide emulsion layer. After exposure the photographic element is processed by developing for 2 minutes at 68° F. in Kodak D-85 Developer, fixed, washed and dried. After processing sharp, high contrast silver images result in the areas of exposure of the developing-out negative silver halide emulsion layer. The developing fog and image density in the print-out emulsion layer is sufficiently low so it does not obscure the developed-out image in the developing-out emulsion layer.

Similar results are obtained when the development restrainers 4-hydroxy-6-methyl-1,3,3a,7-tetrazaindene; 4,5-dihydro-1,4-diphenyl-3,5-phenyl-imino--,2,4-triazole; and the sodium salt of anthraquinone-2-sulfonic acid are used in the print-out layer.

The polyvalent metal salts added to the respective emulsions are added to achieve the optimum desired properties of the respective layers. Emulsions without the polyvalent metal salts, but containing the development restrainer in the print-out layer exhibit the same general effect of a high-contrast, sharp image in the developing-out layer with substantially no discernible image in the print-out layer after development.

The invention has been described in considerable detail with reference to preferred embodiments thereof, but it will be understood that variations and modifications can be effected within the spirit and scope of the invention as described hereinabove and as defined in the appended claims.

We claim:

1. A photographic print-out silver halide emulsion comprising silver halide grains which have a predominant amount of radiation sensitivity internal to said grains, a nitrogen-containing halogen acceptor and a development restrainer.

2. An emulsion according to claim 1 wherein said development restrainer is an anthraquinone containing a sulfonic acid function in the 2-position.

3. An emulsion according to claim 1 wherein said halogen acceptor is a urazole compound.

4. An emulsion according to claim 1 wherein said halogen acceptor is a triazole-thiol compound.

5. An emulsion according to claim 1 wherein said development restrainer is a heterocyclic compound having at least 5 atoms in the ring structure and wherein at least 4 atoms in said ring structure are nitrogen atoms.

6. An emulsion according to claim 5 wherein the sole hetero atoms in said development restrainer are nitrogen atoms.

7. An emulsion according to claim 1 wherein said silver halide is formed in the presence of lead ions.

8. An emulsion according to claim 1 wherein said silver halide is formed in the presence of trivalent ions.

9. An emulsion according to claim 1 wherein said silver halide is silver chlorobromide, said halogen acceptor is a urazole compound and said development restrainer is the sodium salt of anthraquinone-2-sulfonic acid.

10. An emulsion according to claim 1 wherein said development restrainer is a tetrazole.

11. An emulsion according to claim 1 wherein said development restrainer is a tetrazaindene.

12. An emulsion according to claim 1 wherein said emulsion contains from about .05 to 10 grams of development restrainer per mole of silver halide.

13. A photographic element comprising (1) a support and (2) a print-out silver halide emulsion layer comprising silver halide grains having a predominant amount of sensitivity internal to said grains, a nitrogen-containing halogen acceptor and a development restrainer.

14. A photographic element according to claim 13 wherein said silver halide emulsion contains silver chlorobromide grains which have a predominant amount of sensitivity internal to said grains and wherein said development restrainer is an anthraquinone containing a sulfonic acid function in the 2-position.

15. A photographic element comprising (1) a support, (2) a print-out silver halide layer comprising silver halide grains having a predominant amount of sensitivity internal to said grains, a nitrogen-containing halogen acceptor and a development restrainer, and (3) a developing-out silver halide layer.

16. A photographic element according to claim 15 wherein said developing-out layer contains a halogen acceptor.

17. A photographic element according to claim 15 wherein said developing-out layer contains silver halide grains having tetravalent ions occluded therein.

18. A photographic element according to claim 15 wherein said developing-out layer contains a rhodium salt.

19. A photographic element according to claim 15 wherein said developing-out layer comprises a silver chlorobromide emulsion containing silver halide grains precipitated in the presence of tetravalent ions.

20. The process for preparing a silver image which comprises chemically developing in the presence of a development restrainer a photographic element comprising a support and a print-out silver halide layer containing a nitrogen-containing halogen acceptor.

21. The process according to claim 20 wherein said development restrainer is an anthraquinone having a sulfonic acid function in the 2-position.

22. The process according to claim 20 wherein the development restrainer is a heterocyclic compound having at least 5 atoms in the ring structure and wherein at least 4 atoms in the ring structure are nitrogen atoms.

References Cited

UNITED STATES PATENTS

| | | | |
|---|---|---|---|
| 2,036,369 | 4/1936 | Simjiam | 96—68 |
| 3,253,918 | 5/1966 | Condak | 96—44 |
| 3,295,976 | 1/1967 | Abott et al. | 96—66.3 XR |
| 3,342,596 | 9/1967 | Graham | 96—66.3 XR |

NORMAN G. TORCHIN, Primary Examiner

J. R. EVERETT, Assistant Examiner

U.S. Cl. X.R.

96—66.3, 95, 108, 110, 119

PO-1050
(5/69)

UNITED STATES PATENT OFFICE
CERTIFICATE OF CORRECTION

Patent No. 3,458,317          Dated July 29, 1969

Inventor(s) Joseph R. Ditzer, Jr., and Fred W. Spangler

It is certified that error appears in the above-identified patent and that said Letters Patent are hereby corrected as shown below:

Column 1, line 54, "arcuate" should read ---accurate---. Column 2, line 49, "his" should read ---this---. Column 3, line 30, "tautameric" should read ---tautomeric---; line 36, "tiocarbonyl" should read ---thiocarbonyl---; line 36, "(>=S" should read --- (>C=S) ---; lines 48-49, "carbonylphenol" should read ---carbonylphenyl---. Column 5, line 61, "and" should read ---an---; lines 61-62, "salenium" should read ---selenium---; after line 68, the formula reading $$-N\begin{matrix}R^3\\R^6\end{matrix} \text{ should read } -N\begin{matrix}R^5\\R^6\end{matrix}$$

; line 74, "R3" should read ---R5---. Column 6, line 1, "R5" should read ---R3---; lines 16-19, that portion of Formula B set forth as $$N-C-N \text{ should read } N-C-N$$
$$\phantom{N-}Q\phantom{-N} \phantom{\text{should read }} \phantom{N-}Q$$

; lines 23-24, that portion of Formula D set forth as "NH—C" should read --- NH—C≡E ---; line 38, "thiouricil" should read ---thiouracil---. Column 7, line 17, "thiourea" should start at column's left margin to avoid its being considered part of the previously named halogen acceptor; line 47, "alpha-benzyl-alphaphenylhydrazine" should read --- alpha-benzyl-alpha-phenylhydrazine ---. Column 8, line 2, "sliver" should read ---silver---. Column 11, line 36, " -imino--,2,4- " should read --- -imino-1,2,4- ---. Column 12, line 62, "Simjiam" should read ---Simjian---; line 63, "Condak" should read ---Condax---; line 64, "Abott" should read ---Abbott---.

SIGNED AND
SEALED
APR 14 1970

(SEAL)
Attest:

Edward M. Fletcher, Jr.

Attesting Officer

WILLIAM E. SCHUYLER, JR.
Commissioner of Patents